United States Patent
Jeon et al.

(10) Patent No.: US 12,475,963 B2
(45) Date of Patent: Nov. 18, 2025

(54) METHOD OF MEASURING REFRACTIVE INDEX OF SEMICONDUCTOR MEMORY DEVICE AND METHOD OF CLASSIFYING PRODUCT GROUP USING THE SAME

(71) Applicant: SK hynix Inc., Icheon-si (KR)

(72) Inventors: Nam Cheol Jeon, Icheon-si (KR); Tae Un Youn, Icheon-si (KR); Ho Jung Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 173 days.

(21) Appl. No.: 18/466,561

(22) Filed: Sep. 13, 2023

(65) Prior Publication Data

US 2024/0331788 A1 Oct. 3, 2024

(30) Foreign Application Priority Data

Mar. 29, 2023 (KR) ......................... 10-2023-0041134

(51) Int. Cl.
*G11C 29/00* (2006.01)
*G11C 29/10* (2006.01)

(52) U.S. Cl.
CPC .................................... *G11C 29/10* (2013.01)

(58) Field of Classification Search
CPC ............ G11C 2213/79; G11C 2213/71; G11C 13/0007; G11C 13/004; G11C 13/0069; G11C 2013/0073; G11C 2213/32; G11C 2213/72; G11C 16/0466; G11C 11/5628; G11C 11/5635; G11C 11/5642; G11C 11/5671; G11C 13/0004; G11C 16/0483; G11C 16/08; G11C 16/10; G11C 16/16; G11C 16/24; G11C 16/26; G11C 16/30; G11C 16/3445; G11C 16/3459; G11C 16/3495; G11C 2211/5621; G11C 11/5678; G11C 11/40; G11C 13/0014; G11C 13/0019; G11C 13/025; G11C 29/10; G11C 11/223; G11C 13/04; G11C 13/047; G11C 16/0425; G11C 16/0433; G11C 2029/1202; G11C 2213/56; G11C 29/006; G11C 29/025; G11C 29/50; G11C 11/2275; G11C 13/02; G11C 2213/81
USPC ........................................... 365/148, 202, 46
See application file for complete search history.

(56) References Cited

U.S. PATENT DOCUMENTS 8,022,502 B2 * 9/2011 Kanzawa ............. H10N 70/826
365/148
2021/0320182 A1 10/2021 Chien et al.

FOREIGN PATENT DOCUMENTS

KR 1020180064292 A 6/2018

* cited by examiner

*Primary Examiner* — Thong Q Le
(74) *Attorney, Agent, or Firm* — WILLIAM PARK AND ASSOCIATES LTD.

(57) ABSTRACT

Provided herein is a method of measuring a refractive index of a semiconductor memory device and a method of classifying a product group of a semiconductor memory device using the same. The method of measuring a refractive index of a semiconductor memory device includes measuring a positive breakdown voltage and a negative breakdown voltage of each of memory cells coupled to a selected word line. The method also includes checking a refractive index of a charge storage layer of each of the memory cells based on the measured positive breakdown voltage and the measured negative breakdown voltage.

21 Claims, 16 Drawing Sheets

METHOD OF MEASURING REFRACTIVE INDEX OF SEMICONDUCTOR MEMORY DEVICE AND METHOD OF CLASSIFYING PRODUCT GROUP USING THE SAME

CROSS-REFERENCE TO RELATED APPLICATION

The present application claims priority under 35 U.S.C. § 119(a) to Korean patent application number 10-2023-0041134 filed on Mar. 29, 2023, in the Korean Intellectual Property Office, the entire disclosure of which is incorporated by reference herein.

BACKGROUND

1. Technical Field

Various embodiments of the present disclosure generally relate to a method of measuring the refractive index of a semiconductor memory device, and more particularly to a method of measuring the refractive index of a charge storage layer and a method of classifying the product group of the semiconductor memory device using the method of measuring the refractive index.

2. Related Art

A semiconductor memory device includes a memory cell array and a peripheral circuit coupled to the memory cell array. The memory cell array may include a plurality of memory strings, each of which may include a plurality of memory cells in which data can be stored. Further, the peripheral circuit may perform the overall operation such as a program operation, a read operation, and an erase operation on the memory cells.

A semiconductor memory device may be classified as a two-dimensional (2D) semiconductor device in which a plurality of memory strings are horizontally formed on a semiconductor substrate or a three-dimensional (3D) semiconductor device in which a plurality of memory strings are vertically formed on a semiconductor substrate.

A 3D semiconductor device is a semiconductor memory device devised to overcome a limitation in the degree of integration of the 2D semiconductor device, and includes a plurality of memory strings which are vertically formed on the semiconductor substrate. Each of the memory strings includes a drain select transistor, memory cells, and a source select transistor which are coupled in series between a bit line and a source line.

SUMMARY

Various embodiments of the present disclosure are directed to a method capable of measuring the refractive index of the charge storage layers of memory cells included in a semiconductor memory device.

In accordance with an embodiment of the present disclosure is a method of measuring a refractive index of a semiconductor memory device. The method may include measuring a positive breakdown voltage and a negative breakdown voltage of each of memory cells coupled to a selected word line, and checking a refractive index of a charge storage layer of each of the memory cells based on the measured positive breakdown voltage and the measured negative breakdown voltage.

In accordance with an embodiment of the present disclosure is a method of measuring a refractive index of a semiconductor memory device. The method may include dividing memory cells included in a memory string into a lower memory cell group and an upper memory cell group, measuring a negative breakdown voltage of each of first memory cells included in the lower memory cell group, checking a refractive index of a charge storage layer of the first memory cells based on the measured negative breakdown voltage, measuring a positive breakdown voltage of each of second memory cells included in the upper memory cell group, and checking a refractive index of a charge storage layer of the second memory cells based on the measured positive breakdown voltage.

In accordance with an embodiment of the present disclosure is a method of classifying a product group of a semiconductor memory device. The method may include measuring a breakdown voltage of each of memory cells included in a semiconductor memory device, checking a refractive index of a charge storage layer based on breakdown voltages of certain memory cells selected from among the memory cells, and classifying a product group of the semiconductor memory device by comparing the checked refractive index of the charge storage layer with a reference refractive index.

In accordance with an embodiment of the present disclosure is a method of classifying a product group of a semiconductor memory device. The method may include measuring a breakdown voltage of each of memory cells included in a memory string selected from among a plurality of memory strings included in a semiconductor memory device, checking a variation in the breakdown voltage of each of the memory cells, and then calculating a slope of the breakdown voltage, and classifying a product group of the semiconductor memory device based on the slope of the breakdown voltage.

DETAILED DESCRIPTION

Advantages and features of the present disclosure, and methods for achieving the same will be cleared with reference to embodiments described later in detail together with the accompanying drawings. The present disclosure is not limited to the following embodiments but embodied in other forms. Rather, these embodiments are provided so that the present disclosure will be enabling to those skilled in the art.

It is also noted that in this specification, "connected/coupled" refers to one component not only directly coupling another component but also indirectly coupling another component through an intermediate component. In the specification, when an element is referred to as "comprising" or "including" a component, it does not preclude another component but may further include other components unless the context clearly indicates otherwise.

Figure 1:
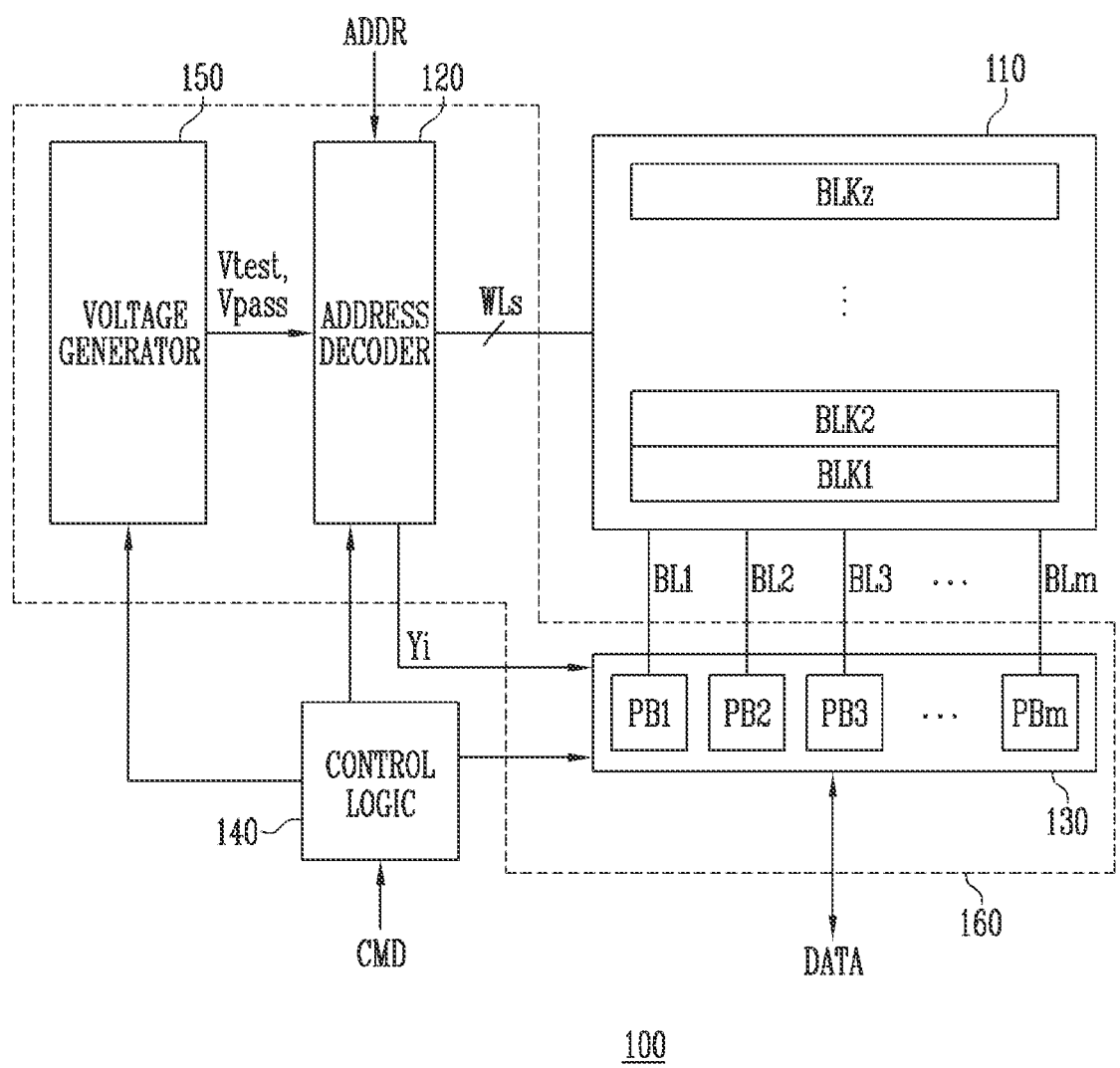
FIG. 1 is a block diagram illustrating a semiconductor memory device according to an embodiment of the present disclosure.

FIG. 1 is a block diagram illustrating a semiconductor memory device according to an embodiment of the present disclosure.

Referring to FIG. 1, a semiconductor memory device 100 includes a memory cell array 110, an address decoder 120, a read and write circuit 130, control logic 140, and a voltage generator 150.

The memory cell array 110 includes a plurality of memory blocks BLK1 to BLKz. The memory blocks BLK1 to BLKz are coupled to the address decoder 120 through word lines WLs. The memory blocks BLK1 to BLKz are coupled to the read and write circuit 130 through bit lines BL1 to BLm. Each of the memory blocks BLK1 to BLKz may include a plurality of memory cells. In an embodiment, the plurality of memory cells may be nonvolatile memory cells. Memory cells coupled to one word line among the plurality of memory cells may be defined as one page. That is, the memory cell array 110 may be composed of a plurality of pages.

In addition, each of the memory blocks BLK1 to BLKz of the memory cell array 110 may include a plurality of cell strings. Each of the cell strings includes a drain select transistor, a plurality of memory cells, and a source select transistor which are coupled in series between a bit line and a source line. The memory cell array 110 will be described in detail later.

The address decoder 120, the read and write circuit 130, and the voltage generator 150 are operated as a peripheral circuit 160 for driving the memory cell array 110.

The address decoder 120 may be coupled to the memory cell array 110 through the word lines WLs. The address decoder 120 may be operated under the control of the control logic 140. The address decoder 120 receives addresses ADDR through an input/output buffer (not illustrated) provided in the semiconductor memory device 100.

During a test operation, the address decoder 120 may transfer a test voltage Vtest and a pass voltage Vpass that are generated by the voltage generator 150 to the word lines WLs of the memory cell array 110. Also, the address decoder 120 may be coupled to an external test device (not illustrated) disposed outside the semiconductor memory device, and the external test device may check the amount of current flowing through a selected word line during the test operation of the semiconductor memory device.

For example, during the test operation, the address decoder 120 may apply the test voltage Vtest to the selected word line among the word lines WLs, and may apply the pass voltage Vpass to the remaining word lines other than the selected word line.

The address decoder 120 may decode a column address among the received addresses ADDR. The address decoder 120 may transmit a decoded column address Yi to the read and write circuit 130.

The address decoder 120 may include a block decoder, a row decoder, a column decoder, an address buffer, etc.

The read and write circuit 130 may include a plurality of page buffers PB1 to PBm. The plurality of page buffers PB1 to PBm are coupled to the memory cell array 110 through the bit lines BL1 to BLm. The plurality of page buffers PB1 to PBm may control the potentials of the corresponding bit lines BL1 to BLm, respectively, depending on data to be programmed DATA during a program operation. The plurality of page buffers PB1 to PBm may sense read data based on the potentials or currents of the bit lines BL1 to BLm, respectively, during a read operation. The plurality of page buffers PB1 to PBm may control the potentials of the bit lines BL1 to BLm, respectively, to 0 V during the test operation.

The read and write circuit 130 may be operated in response to control of the control logic 140.

In an example embodiment, the read and write circuit 130 may include page buffers (or page registers), a column select circuit, etc.

The control logic 140 is coupled to the address decoder 120, the read and write circuit 130, and the voltage generator 150. The control logic 140 may receive a command CMD and a control signal CTRL through the input/output buffer (not illustrated) of the semiconductor memory device 100. The control logic 140 may control the overall operation of the semiconductor memory device 100 in response to the command CMD. The control logic 140 may be implemented as hardware, software, or a combination of hardware and software. For example, the control logic 140 may be a control logic circuit operating in accordance with an algorithm and/or a processor executing control logic code.

The voltage generator 150 may generate the test voltage Vtest and the pass voltage Vpass and transmit the voltages to the address decoder 120 during the test operation.

In an embodiment, during the test operation of the semiconductor memory device, the test voltage Vtest and the pass voltage Vpass may be applied to the word lines WLs using the external test device provided outside the semiconductor memory device, and the amounts of current flowing through the word lines WLs may be checked.

Figure 2:
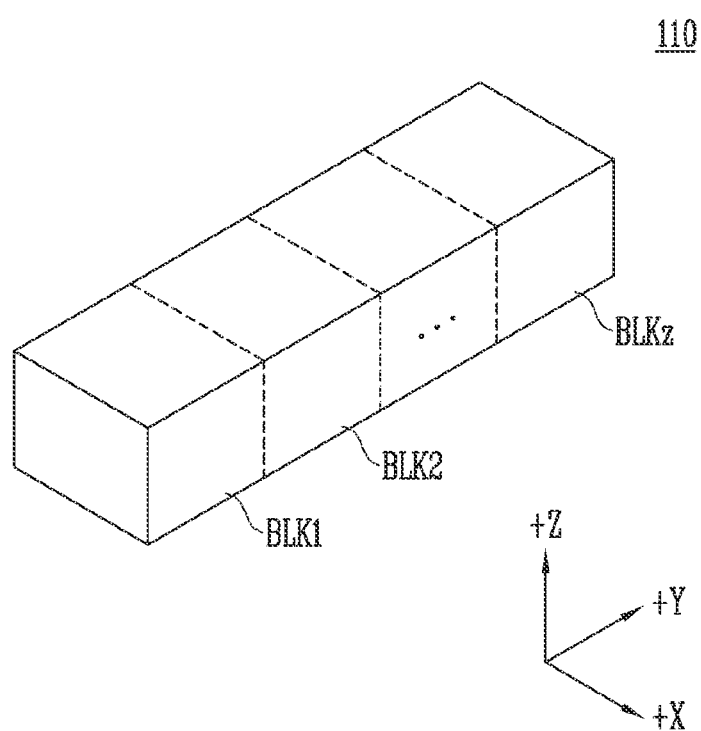
FIG. 2 is a block diagram illustrating an embodiment of a memory cell array of FIG. 1.

FIG. 2 is a block diagram illustrating an embodiment of the memory cell array of FIG. 1.

Referring to FIG. 2, the memory cell array 110 includes a plurality of memory blocks BLK1 to BLKz. Each memory block has a three-dimensional (3D) structure. Each memory block includes a plurality of memory cells stacked on a substrate. The plurality of memory cells are arranged in +X, +Y, and +Z directions. The structure of each memory block will be described in detail below with reference to FIGS. 3, 4, and 5.

Figure 3:
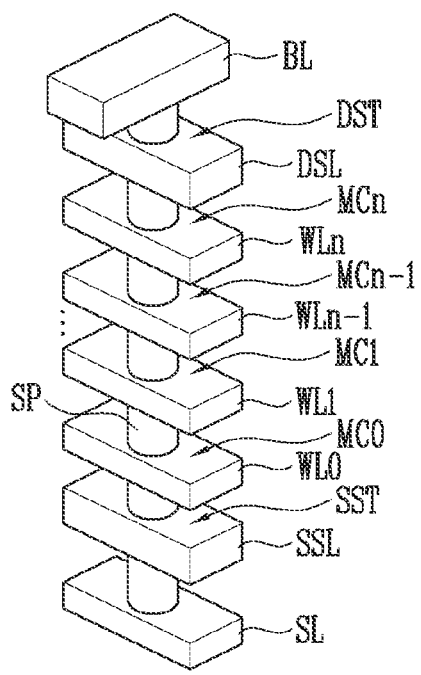
FIG. 3 is a perspective view for describing a memory string included in a memory block according to the present disclosure.

FIG. 3 is a perspective view for describing a memory string included in a memory block according to the present disclosure.

Referring to FIG. 3, a source line SL may be formed on a semiconductor substrate. A vertical channel structure SP may be formed on the source line SL. An upper portion of the vertical channel layer SP is coupled to a corresponding bit line BL. The vertical channel structure SP may include a channel layer extending in a vertical direction and a multi-layer structure enclosing the sidewall of the channel layer. The multi-layer structure may be formed of an oxide-nitride-oxide (ONO) structure in which an oxide layer, a nitride layer, and an oxide layer are sequentially stacked. The channel layer may be formed of a polysilicon layer. The multi-layer structure may include a charge storage layer.

A plurality of conductive layers SSL, WL0 to WLn, and DSL are formed in such a way as to enclose the vertical channel structure SP at different heights of the vertical channel structure SP. The multi-layer structure may be formed of an oxide-nitride-oxide (ONO) structure in which an oxide layer, a nitride layer, and an oxide layer are sequentially stacked.

The lowermost conductive layer forms a source select line SSL, and the uppermost conductive layer forms a drain select line DSL. The conductive layers disposed between the select lines SSL and DSL form the respective word lines WL0 to WLn. In other words, the conductive layers SSL, WL0 to WLn, and DSL are formed in a multi-layer structure on the semiconductor substrate. The vertical channel structure SP penetrating the conductive layers SSL, WL0 to WLn, and DSL is vertically coupled between the bit line BL and the source line SL formed on the semiconductor substrate.

A drain select transistor DST is formed in a portion of the uppermost conductive layer DSL that encloses the vertical channel structure SP, and a source select transistor SST is formed in a portion of the lowermost conductive layer SSL that encloses the vertical channel structure SP. Memory cells MC0 to MCn are formed in portions of the intermediate conductive layers WL0 to WLn that enclose the vertical channel structure SP.

In this way, the memory string includes the source select transistor SST, the memory cells MC0 to MCn, and the drain select transistor DST, which are vertically coupled to the semiconductor substrate between the source line SL and the bit line BL. The source select transistor SST electrically connects the memory cells MC0 to MCn to the source line SL depending on a source control voltage applied to the source select line SSL. The drain select transistor DST electrically connects the memory cells MC0 to MCn to the bit line BL depending on a drain control voltage applied to the drain select line DSL.

Figure 4:
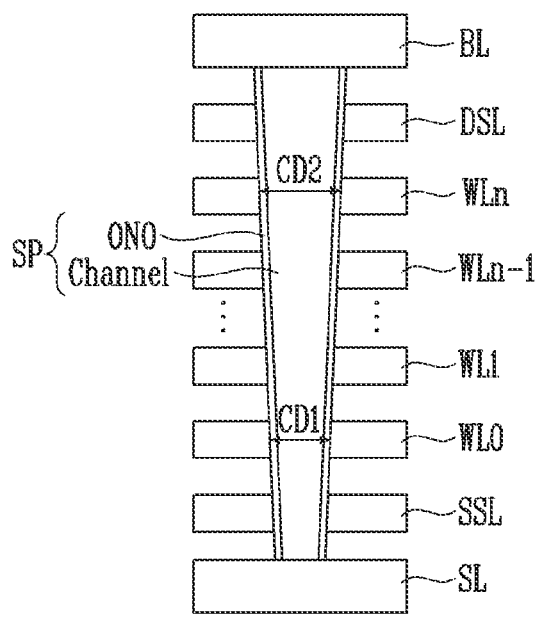
FIG. 4 is a sectional view of the memory string illustrated in FIG. 3.

FIG. 4 is a sectional view of the memory string illustrated in FIG. 3.

Referring to FIG. 4, a source line SL may be formed on a semiconductor substrate. A channel layer (Channel) is formed on the source line SL. An upper portion of the channel layer (Channel) is coupled to a bit line BL. The channel layer (Channel) may be made of polysilicon. A plurality of conductive layers SSL, WL0 to WLn, and DSL are formed in such a way as to enclose the channel layer (Channel) at different heights of the channel layer (Channel). A memory layer ONO including a charge storage layer may be formed on the surface of the channel layer (Channel), and may also be disposed between the channel layer (Channel) and the conductive layers SSL, WL0 to WLn, and DSL. The channel layer (Channel) and the memory layer ONO may correspond to the vertical channel structure SP of FIG. 3.

The lowermost conductive layer may form a source select line SSL, and the uppermost conductive layer may form a drain select line DSL. The conductive layers disposed between the select lines SSL and DSL may form word lines WL0 to WLn.

In a portion in which the source select line SSL encloses the vertical channel structure SP, a source select transistor may be formed, and in a portion in which the drain select line DSL encloses the vertical channel structure SP, a drain select transistor may be formed. In portions in which the word lines WL0 to WLn enclose the vertical channel structure SP, memory cells may be formed.

The vertical channel structure SP of the above-described memory string may have a structure in which the width of the upper portion thereof is greater than that of the lower portion thereof. For example, the width CD1 of the vertical channel structure of the memory cell corresponding to the conductive layer WL0 may be less than the width CD2 of the vertical channel structure of the memory cell corresponding to the conductive layer WLn. Also, as the corresponding memory cell is farther from the drain select transistor and more adjacent to the semiconductor substrate, the width of the vertical channel structure of the memory cell is more reduced.

Figure 5:
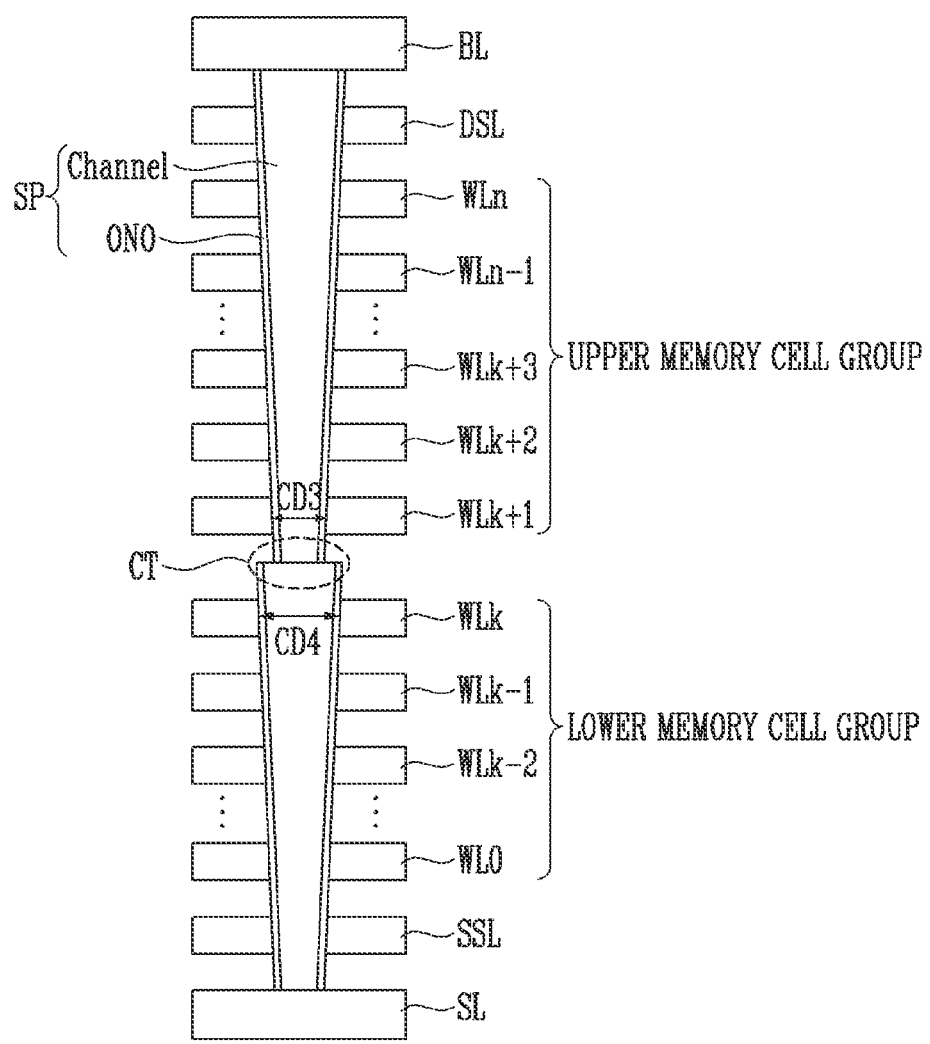
FIG. 5 is a sectional view for describing an example of the structure of the memory string illustrated in FIG. 3.

FIG. 5 is a sectional view for describing an example of the structure of the memory string illustrated in FIG. 3.

Referring to FIG. 5, a common source line SL may be formed on a semiconductor substrate. A channel is formed on the common source line SL. An upper portion of the channel layer (Channel) is coupled to a bit line BL. The channel layer (Channel) may be made of polysilicon. A plurality of conductive layers SSL, WL0 to WLn, and DSL are formed in such a way as to enclose the channel layer (Channel) at different heights of the channel layer (Channel). A memory layer ONO including a charge storage layer may be formed on the surface of the channel layer (Channel), and may also be disposed between the channel layer (Channel) and the conductive layers SSL, WL0 to WLn, and DSL. The channel layer (Channel) and the memory layer ONO may correspond to the vertical channel structure SP of FIG. 3.

The lowermost conductive layer may form a source select line SSL, and the uppermost conductive layer may form a drain select line DSL. The conductive layers disposed between the select lines SSL and DSL may form word lines WL0 to WLn.

In a portion in which the source select line SSL encloses the vertical channel structure SP, a source select transistor may be formed, and in a portion in which the drain select line DSL encloses the vertical channel structure SP, a drain select transistor may be formed. In portions in which the word lines WL0 to WLn enclose the vertical channel structure SP, memory cells may be formed.

The memory cells included in the above-described memory string may be divided into a lower memory cell group and an upper memory cell group. For example, the upper memory cell group may include memory cells corresponding to word lines WLk+1 to WLn. For example, the lower memory cell group may include memory cells corresponding to word lines WL0 to WLk. The upper memory cell group may have a stacked structure together with the lower memory cell group. The vertical channel structure of the lower memory cell group and the vertical channel structure of the upper memory cell group may contact each other in a contact portion CT.

Here, the width CD4 of the vertical channel structure of a memory cell disposed in the uppermost portion of the lower memory cell group is different from the width CD3 of the vertical channel structure of a memory cell disposed in the lowermost portion of the upper memory cell group. In detail, the width CD4 of the vertical channel structure of the memory cell disposed in the uppermost portion of the lower memory cell group is greater than the width CD3 of the vertical channel structure of the memory cell disposed in the lowermost portion of the upper memory cell group.

Figure 6A:
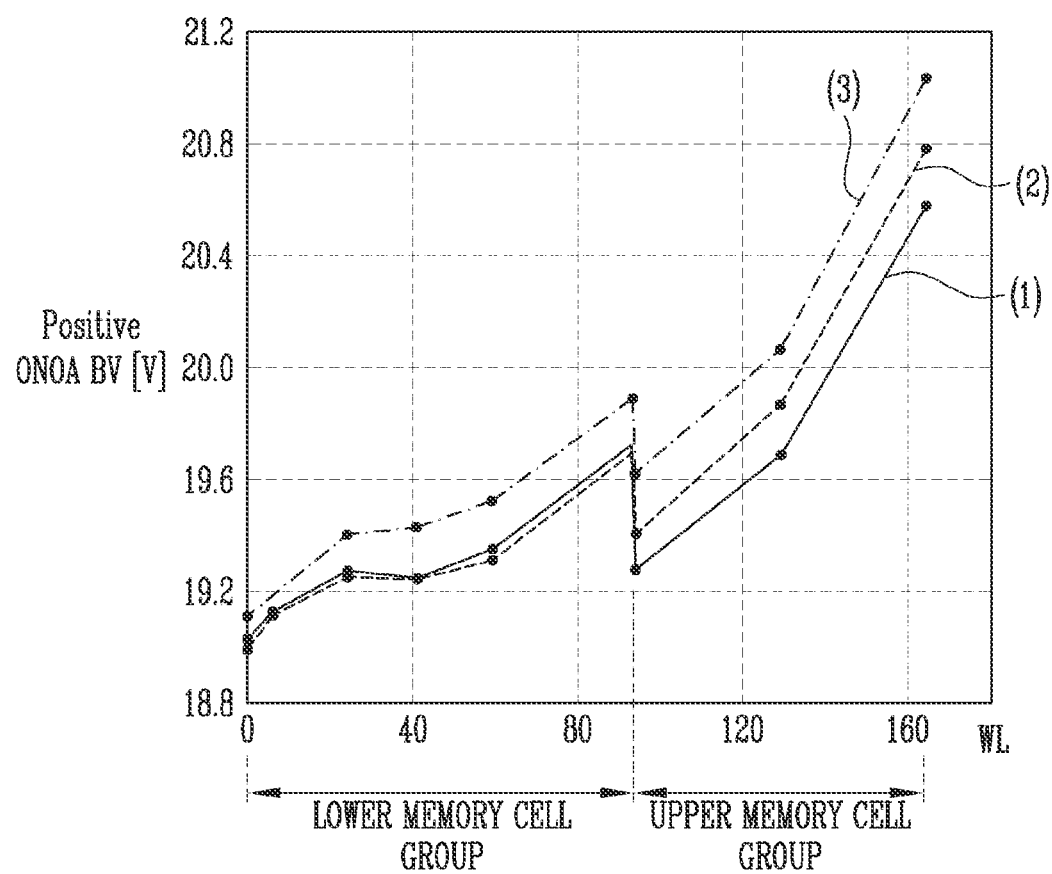
FIGS. 6A and 6B are diagrams illustrating the breakdown voltage of memory cells depending on the refractive index of a charge storage layer.
Figure 6B:
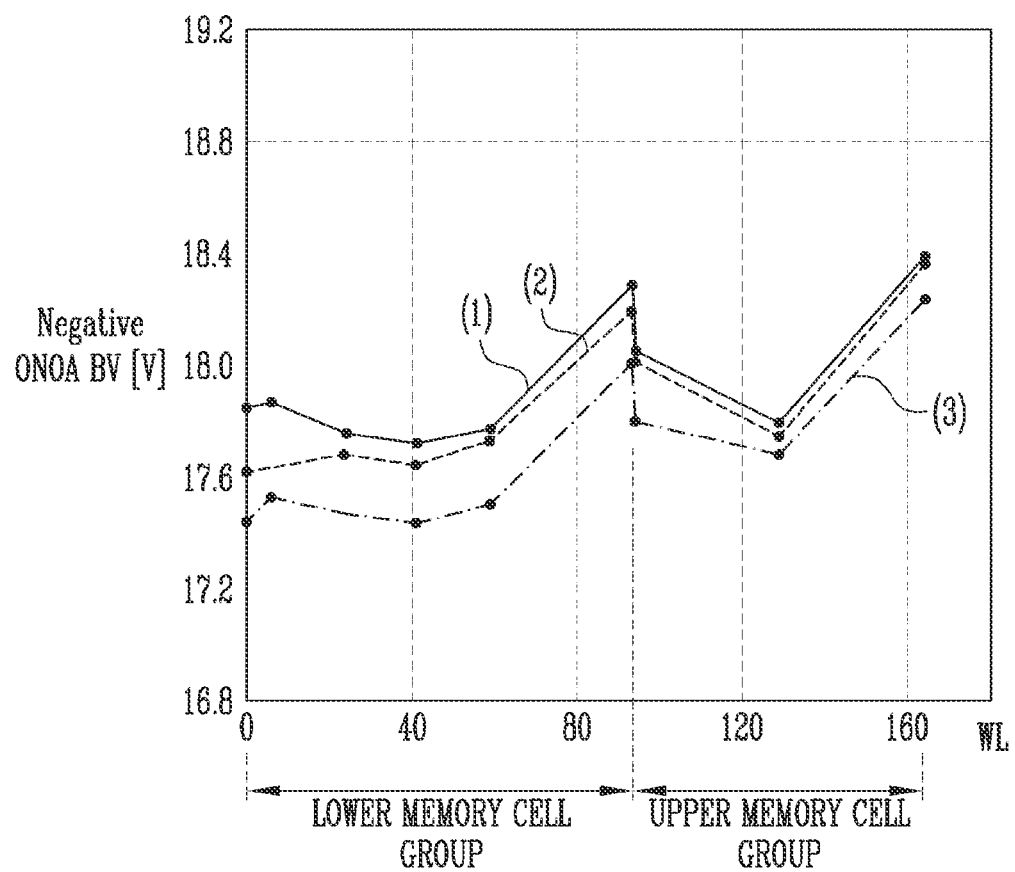

FIGS. 6A and 6B are diagrams illustrating the breakdown voltage of memory cells depending on the refractive index of a charge storage layer.

FIG. 6A is a view for describing the positive breakdown voltage of a memory string including the lower memory cell group and the upper memory cell group illustrated in FIG. 5 depending on the refractive index of the charge storage layer.

The positive breakdown voltage (Positive ONOA BV) of a memory cell increases in proportion to the amount of electron trapping in the corresponding memory cell. Therefore, the amount of electron trapping in the memory cell may be predicted by measuring the positive breakdown voltage (Positive ONOA BV) of the memory cell.

The refractive index of a charge storage layer (1) is greater than that of a charge storage layer (2), and the refractive index of the charge storage layer (2) is greater than that of a charge storage layer (3).

Referring to FIG. 6A, the positive breakdown voltage (Positive ONOA BV) of the charge storage layer (1) having a relatively high refractive index may be lower than the positive breakdown voltages (Positive ONOA BV) of the charge storage layers (2 and 3) having a relatively low refractive index. Further, the positive breakdown voltages (Positive ONOA BV) of the memory cells may be gradually increased as the word line WL corresponding thereto is disposed in an upper portion. For example, as the memory cells included in the lower memory cell group are more adjacent to a source select transistor, the positive breakdown voltages (Positive ONOA BV) may be decreased. As the memory cells included in the upper memory cell group are more adjacent to a drain select transistor, the positive breakdown voltages (Positive ONOA BV) may be increased.

Furthermore, the variation in positive breakdown voltages (Positive ONOA BV) depending on changes in the refractive indices of the memory cells included in the upper memory cell group may be greater than the variation in positive breakdown voltages (Positive ONOA BV) depending on changes in the refractive indices of the memory cells included in the lower memory cell group.

FIG. 6B is a view for describing the negative breakdown voltage of a memory string including the lower memory cell group and the upper memory cell group illustrated in FIG. 5 depending on the refractive index of the charge storage layer.

The negative breakdown voltage (Negative ONOA BV) of a memory cell increases in proportion to the amount of hole trapping in the corresponding memory cell. Therefore, the amount of hole trapping in the memory cell may be predicted by measuring the negative breakdown voltage (Negative ONOA BV) of the memory cell.

The refractive index of a charge storage layer (1) is greater than that of a charge storage layer (2), and the refractive index of the charge storage layer (2) is greater than that of a charge storage layer (3).

Referring to FIG. 6B, the negative breakdown voltage (Negative ONOA BV) of the charge storage layer (1) having a relatively high refractive index may be higher than the negative breakdown voltages (Negative ONOA BV) of the charge storage layers (2 and 3) having a relatively low refractive index.

Furthermore, the variation in negative breakdown voltages (Negative ONOA BV) depending on changes in the refractive indices of the memory cells included in the lower memory cell group may be greater than the variation in negative breakdown voltages (Negative ONOA BV) depending on changes in the refractive indices of the memory cells included in the upper memory cell group.

Figure 7A:
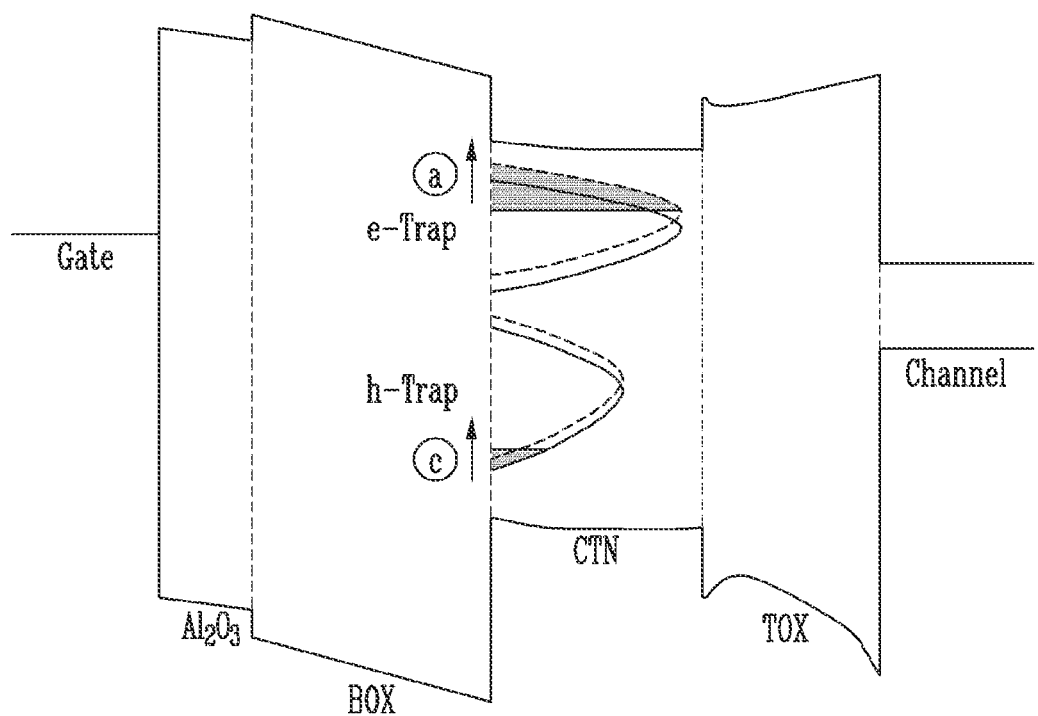
FIGS. 7A and 7B are diagrams for describing changes in the amount of electron trapping and the amount of hole trapping depending on the refractive index of a charge storage layer.
Figure 7B:
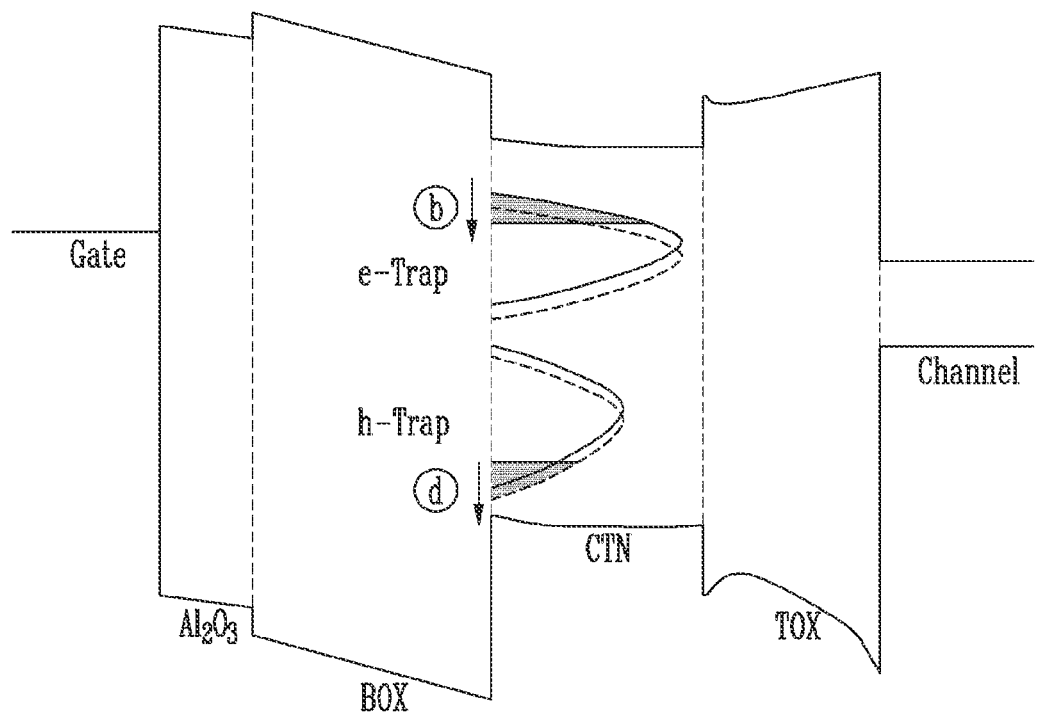

FIGS. 7A and 7B are diagrams for describing changes in the amount of electron trapping and the amount of hole trapping depending on the refractive index of the charge storage layer.

FIG. 7A is a band diagram of a memory cell including a charge storage layer CTN having a relatively high refractive index, and FIG. 7B is a band diagram of a memory cell including a charge storage layer CTN having a relatively low refractive index.

During a program operation on each memory cell, charges may be trapped in the charge storage layer CTN of the corresponding memory cell. At this time, some charges may be trapped in a shallow trap site of the charge trap layer CTN. The charges trapped in the shallow trap site may be in a relatively unstable state. When a certain time has elapsed from the program operation, the charges trapped in the shallow trap site may be detrapped, whereby the threshold voltage of the memory cell may be decreased.

To prevent this phenomenon, during a process of manufacturing the memory cell, a tunnel insulating layer TOX, the charge storage layer CTN, and a blocking insulating layer BOX ($Al_2O_3$) are formed, after which a heat treatment process using deuterium (D2) is performed to remove the shallow trap site among electron trap sites.

Referring to FIG. 7A, in the case of electron trapping @ in a memory cell including a charge storage layer CTN having a relatively high refractive index, the refractive index of the memory cell is relatively high and then the memory cell may have an electron trap level (indicated by a dotted line) higher than the electron trap level (indicated by a solid line) of a memory cell having a reference (standard) refractive index. Here, through the heat treatment process using deuterium (D2), a relatively large shallow trap site (indicated by a hatched portion) may be removed, with the result that the positive breakdown voltage (Positive ONOA BV) may be decreased. That is, as the refractive index is higher, the positive breakdown voltage (Positive ONOA BV) may be decreased.

Referring to FIG. 7B, in the case of electron trapping b in a memory cell including a charge storage layer CTN having a relatively low refractive index, the refractive index of the memory cell may be relatively low and then the memory cell may have an electron trap level (indicated by a dotted line) lower than the electron trap level (indicated by a solid line) of a memory cell having a reference (standard) refractive index. The effect of removing a shallow trap site through the heat treatment process using deuterium (D2) may be increased, with the result that the total size of a hole trap site may be decreased. Accordingly, as the refractive index of the charge storage layer CTN is lower, the negative breakdown voltage (Negative ONOA BV) may be decreased.

Referring to FIG. 7A, in the case of hole trapping @ in the memory cell including a charge storage layer CTN having a relatively high refractive index, the refractive index of the memory cell is relatively high and then the memory cell may have a hole trap level (indicated by a dotted line) higher than the hole trap level (indicated by a solid line) of a memory cell having a reference (standard) refractive index. Here, the effect of removing a shallow trap site through the heat treatment process using deuterium (D2) is insufficient, with the result that the variation in negative breakdown voltage (Negative ONOA BV) may be relatively small.

Referring to FIG. 7B, in the case of hole trapping @ in the memory cell including a charge storage layer CTN having a relatively low refractive index, the refractive index of the memory cell may be relatively low and then the memory cell may have a hole trap level (indicated by a dotted line) lower than the hole trap level (indicated by a solid line) of the memory cell having a reference (standard) refractive index. Here, a relatively large shallow trap site (indicated by a hatched portion) is removed through the heat treatment process using deuterium (D2), with the result that the total size of a hole trap site may be decreased. Accordingly, as the refractive index of the charge storage layer CTN is lower, the negative breakdown voltage (Negative ONOA BV) may be decreased.

Based on the above-described FIGS. 6A, 6B, 7A, and 7B, the refractive index of the charge storage layer may be predicted using the positive breakdown voltage and the negative breakdown voltage of the memory cell having the charge storage layer.

Figure 8:
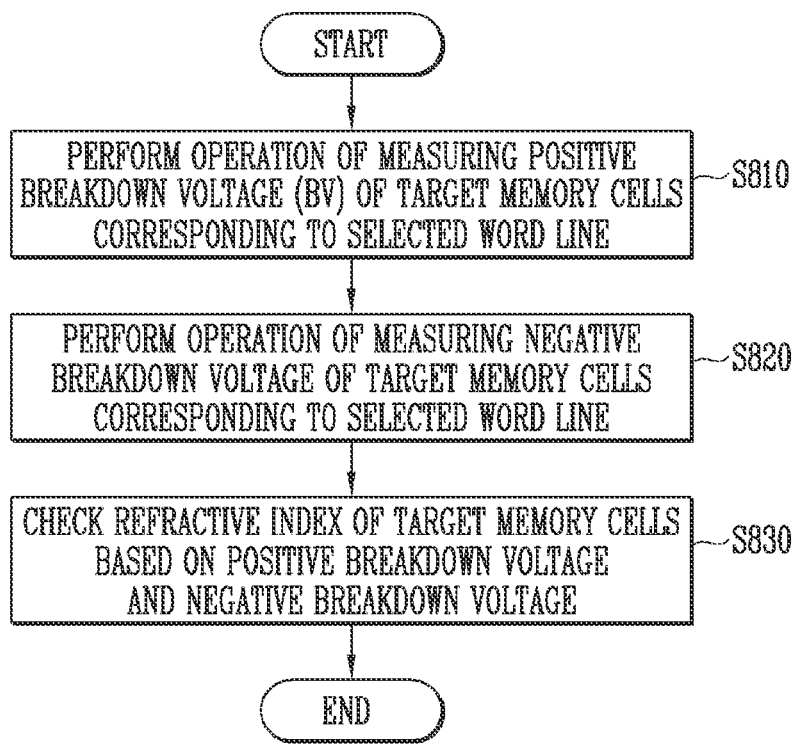
FIG. 8 is a flowchart illustrating a method of measuring the refractive index of the charge storage layers of memory cells according to an embodiment of the present disclosure.

FIG. 8 is a flowchart illustrating a method of measuring the refractive index of the charge storage layers of memory cells according to an embodiment of the present disclosure.

Figure 9A:
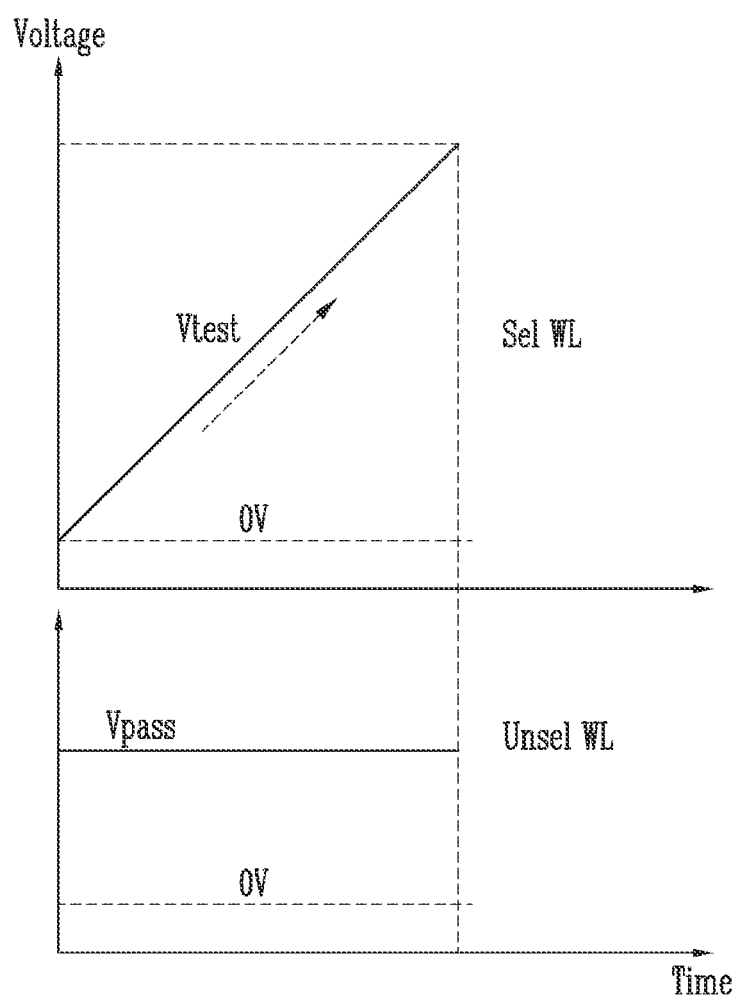
FIGS. 9A and 9B are diagrams for describing an operation of measuring the positive breakdown voltage of memory cells and an operation of measuring the negative breakdown voltage of the memory cells.
Figure 9B:
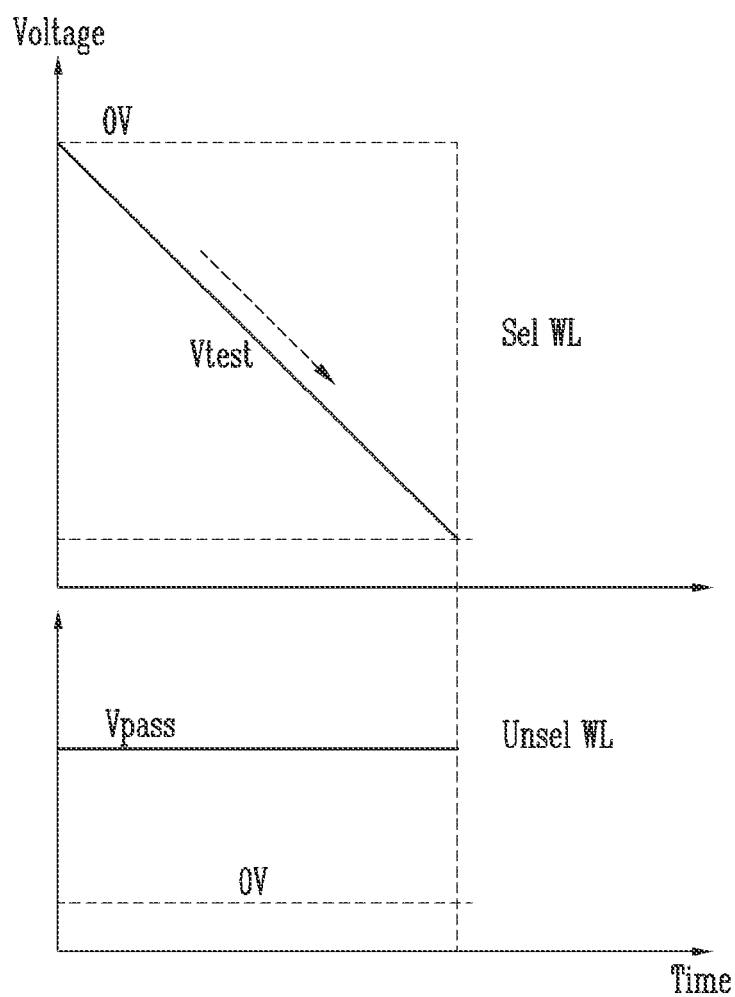

FIGS. 9A and 9B are diagrams for describing an operation of measuring the positive breakdown voltage of each of memory cells and an operation of measuring the negative breakdown voltage of each of the memory cells.

The method of measuring the refractive index of charge storage layers of memory cells according to an embodiment of the present disclosure will be described in detail with reference to FIGS. 1 to 5, 6A, 6B, 8, 9A, and 9B.

At step S810, an operation of measuring the positive breakdown voltage of target memory cells MC0 corresponding to a selected word line (e.g., WL0) is performed.

Referring to FIG. 9A, a test voltage Vtest that is gradually increasing may be applied to the selected word line Sel WL, and a pass voltage Vpass may be applied to the remaining word lines, that is, unselected word lines Unsel WL. Here, a voltage of 0 V may be applied to the source line SL and the bit lines BL1 to BLm.

The test voltage Vtest may be a positive voltage, and may be a voltage that increases in proportion to time.

The positive breakdown voltage may be measured by measuring the gate currents of the memory cells while applying the test voltage Vtest to the selected word line Sel WL. For example, the value of the test voltage Vtest at a time point at which the gate currents of the memory cells sharply increase may be a positive breakdown voltage.

For example, as the refractive index of a charge storage layer is higher, the positive breakdown voltage of the memory cell may be lower.

At step S820, an operation of measuring the negative breakdown voltage of the target memory cells MC0 corresponding to the selected word line (e.g., WL0) is performed.

Referring to FIG. 9B, a test voltage Vtest that is gradually decreasing may be applied to the selected word line Sel WL, and the pass voltage Vpass may be applied to the remaining word lines, that is, unselected word lines Unsel WL. Here, a voltage of 0 V may be applied to the source line SL and the bit lines BL1 to BLm.

The test voltage Vtest may be a negative voltage, and may be a voltage that decreases in proportion to time.

The negative breakdown voltage may be measured by measuring the gate currents of the memory cells while applying the test voltage Vtest to the selected word line Sel WL. For example, the value of the test voltage Vtest at a time point at which the gate currents of the memory cells sharply increase may be the negative breakdown voltage.

For example, as the refractive index of the charge storage layer is higher, the negative breakdown voltage of the memory cell may be higher.

At step S830, the refractive index of the target memory cells MC0 may be checked based on the measured positive breakdown voltage and the measured negative breakdown voltage.

For example, the refractive index of each charge storage layer corresponding to the measured positive breakdown voltage and the measured negative breakdown voltage is checked using views or tables indicating positive breakdown voltages and negative breakdown voltages based on the refractive indices of charge storage layers, as illustrated in FIGS. 6A and 6B.

When the operation of checking the refractive index of the charge storage layers of the target memory cells MC0 corresponding to the above-described selected word line (e.g., WL0) is completed, an operation of checking the refractive index of the charge storage layers of the target memory cells MC1 corresponding to a next word line (e.g., WL1) may be performed.

The above-described operation of checking the refractive index of the charge storage layers may be performed sequentially for respective word lines.

As described above, according to an embodiment of the present disclosure, the positive breakdown voltage and the negative breakdown voltage of the memory cells may be measured, and the refractive index of the charge storage layer corresponding to the measured voltages may be checked.

Figure 10:
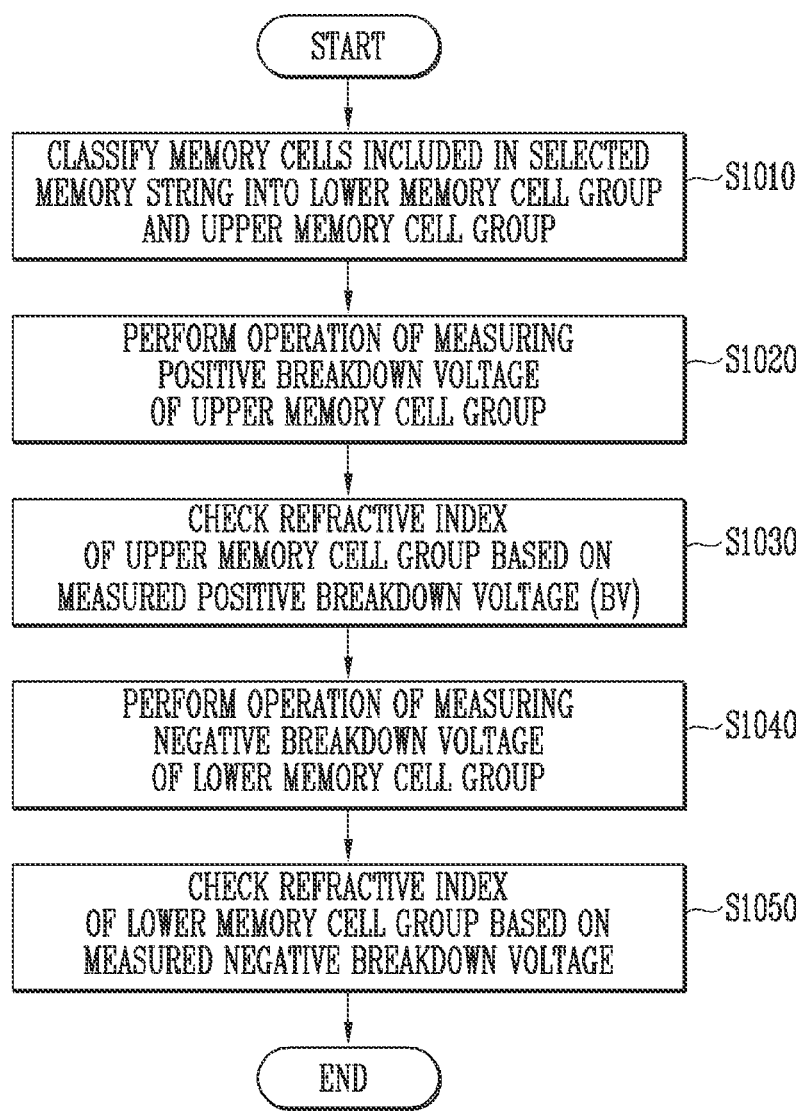
FIG. 10 is a flowchart illustrating a method of measuring the refractive index of the charge storage layers of memory cells according to an embodiment of the present disclosure.

FIG. 10 is a flowchart illustrating a method of measuring the refractive index of the charge storage layers of memory cells according to an embodiment of the present disclosure.

The method of measuring the refractive index of charge storage layers of memory cells according to an embodiment of the present disclosure will be described in detail with reference to FIGS. 1 to 5, 6A, 6B, 9A, 9B, and 10.

At step S1010, memory cells MC0 to MCn included in a selected memory string may be divided into a lower memory cell group and an upper memory cell group.

For example, among memory cells corresponding to the plurality of word lines WL0 to WLn illustrated in FIGS. 4 and 5, memory cells relatively adjacent to the source line SL may be defined as the lower memory cell group, and memory cells relatively adjacent to the bit line BL may be defined as the upper memory cell group. For example, in a memory string vertically extending on a semiconductor substrate, memory cells included in the upper memory cell group may be arranged to overlap the upper portion of memory cells included in the lower memory cell group.

At step S1020, an operation of measuring the positive breakdown voltage of each of the memory cells included in the upper memory cell group is performed.

Referring to FIG. 9A, a test voltage Vtest that is gradually increasing may be applied to the selected word line Sel WL, and a pass voltage Vpass may be applied to the remaining word lines, that is, unselected word lines Unsel WL. Here, a voltage of 0 V may be applied to the source line SL and the bit lines BL1 to BLm.

The test voltage Vtest may be a positive voltage, and may be a voltage that increases in proportion to time.

The positive breakdown voltage may be measured by measuring the gate currents of the memory cells while applying the test voltage Vtest to the selected word line Sel WL. For example, the value of the test voltage Vtest at a time point at which the gate currents of the memory cells sharply increase may be a positive breakdown voltage.

The operation of measuring the positive breakdown voltage of each of the memory cells included in the upper memory cell group is performed by performing the above-described operation of measuring the positive breakdown voltage of the memory cell on each of the memory cells.

At step S1030, the refractive index of the charge storage layer of each of the memory cells included in the upper memory cell group is checked based on the positive breakdown voltage of each memory cell included in the upper memory cell group.

For example, the refractive index of the charge storage layer corresponding to the measured positive breakdown voltage is checked using the view or table indicating the positive breakdown voltages based on the refractive indices of the charge storage layers, as illustrated in FIG. 6A.

At step S1040, an operation of measuring the negative breakdown voltage of each of the memory cells included in the lower memory cell group is performed.

Referring to FIG. 9B, a test voltage Vtest that is gradually decreasing may be applied to the selected word line Sel WL, and the pass voltage Vpass may be applied to the remaining word lines, that is, unselected word lines Unsel WL. Here, a voltage of 0 V may be applied to the source line SL and the bit lines BL1 to BLm.

The test voltage Vtest may be a negative voltage, and may be a voltage that decreases in proportion to time.

The negative breakdown voltage may be measured by measuring the gate currents of the memory cells while applying the test voltage Vtest to the selected word line Sel WL. For example, the value of the test voltage Vtest at a time point at which the gate currents of the memory cells sharply increase may be the negative breakdown voltage.

The operation of measuring the negative breakdown voltage of each of the memory cells included in the lower memory cell group is performed by performing the above-described operation of measuring the negative breakdown voltage of the memory cell on each of the memory cells.

At step S1050, the refractive index of the charge storage layer of each of the memory cells included in the lower memory cell group is checked based on the negative breakdown voltage of each memory cell included in the lower memory cell group.

For example, the refractive index of the charge storage layer corresponding to the measured negative breakdown voltage is checked using the view or table indicating the negative breakdown voltages based on the refractive indices of the charge storage layers, as illustrated in FIG. 6B.

As described above, according to an embodiment of the present disclosure, memory cells included in a memory string may be divided into a lower memory cell group and an upper memory cell group, the refractive index of charge storage layers of memory cells included in the lower memory cell group may be checked based on a negative breakdown voltage, and the refractive index of charge storage layers of memory cells included in the upper memory cell group may be checked based on a positive breakdown voltage.

Figure 11:
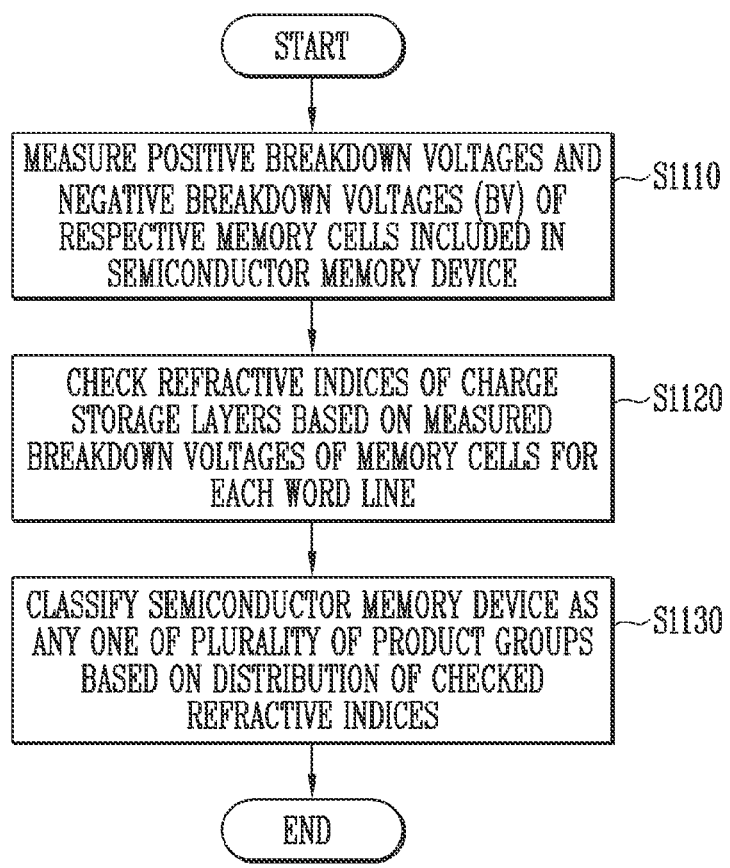
FIG. 11 is a flowchart illustrating a method of classifying the product group of a semiconductor memory device according to an embodiment of the present disclosure.

FIG. 11 is a flowchart illustrating a method of classifying the product group of a semiconductor memory device according to an embodiment of the present disclosure.

Figure 12:
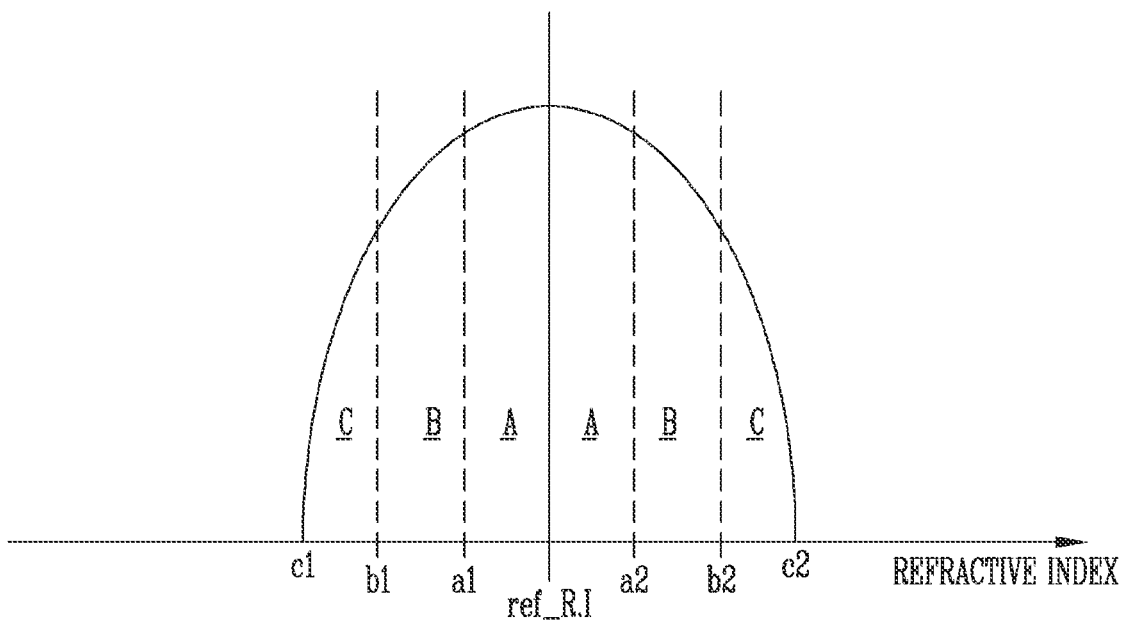
FIG. 12 is a diagram for describing a plurality of product groups depending on the distribution of refractive indices of charge storage layers.

FIG. 12 is a diagram for describing a plurality of product groups depending on the distribution of refractive indices of charge storage layers.

The method of classifying the product group of a semiconductor memory device according to an embodiment of the present disclosure will be described in detail below with reference to FIGS. 1 to 5, 6A, 6B, 8, 9A, 9B, 11, and 12.

At step S1110, the positive breakdown voltages and the negative breakdown voltages of respective memory cells included in the semiconductor memory device are individually measured.

A positive breakdown voltage measurement method and a negative breakdown voltage measurement method may be performed by applying the test voltage Vtest to the selected word line, as illustrated at steps S810 and S820 of FIG. 8 and in FIGS. 9A and 9B.

At step S1120, the refractive indices of respective charge storage layers of the memory cells may be checked based on the positive breakdown voltages and the negative breakdown voltages of the memory cells for each word line. The operation of checking the refractive indices of the charge storage layers may be performed in the same manner as step S830 of FIG. 8.

At step S1130, the semiconductor memory device may be classified as any one of a plurality of product groups based on the distribution of the checked refractive indices.

For example, the average of refractive indices of some or all of the memory cells included in the semiconductor memory device is determined to be the refractive index of the representative charge storage layer of the semiconductor memory device, and is compared with a reference refractive index (ref_R.I), and thus the semiconductor memory device may be classified as any one of the plurality of product groups.

For example, when the refractive index of the representative charge storage layer of the semiconductor memory device is included in a range from a1 to a2 in FIG. 12, the semiconductor memory device may be classified as product group A. Further, when the refractive index of the representative charge storage layer of the semiconductor memory device is included in a range from b1 to a1 or a range from a2 to b2 in FIG. 12, the semiconductor memory device may be classified as product group B. Furthermore, when the refractive index of the representative charge storage layer of the semiconductor memory device is included in a range from c1 to b1 or a range from b2 to c2 in FIG. 12, the semiconductor memory device may be classified as product group C.

As described above, the product group of the semiconductor memory device may be classified based on the refractive indices of the charge storage layers of the memory cells included in the semiconductor memory device. The semiconductor memory device classified as a plurality of product groups may have different data reliabilities for respective product groups, and may be utilized for purposes based on the corresponding data reliability.

Figure 13:
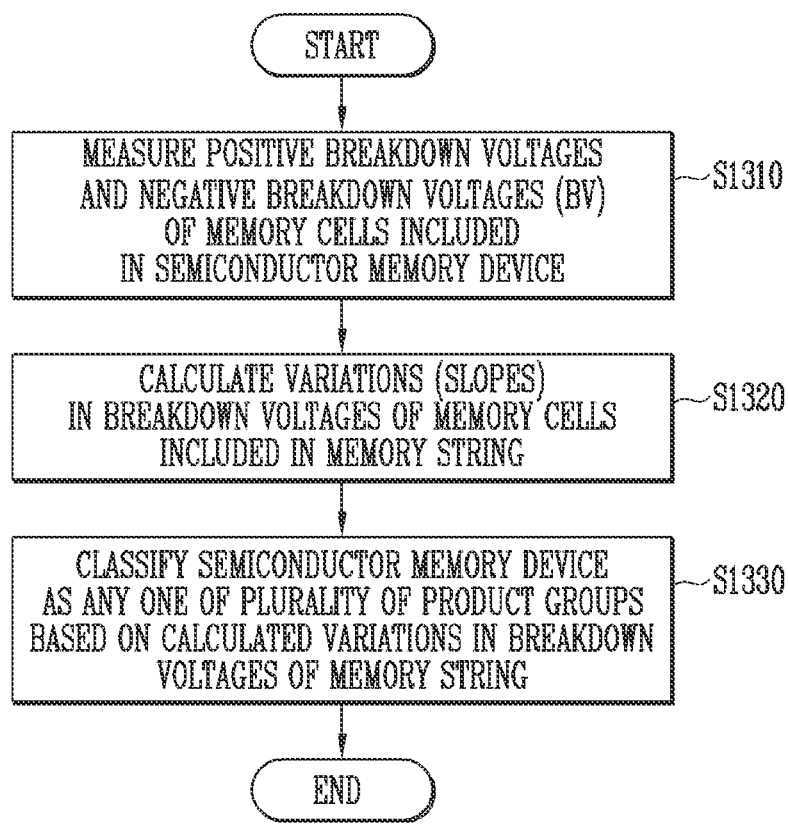
FIG. 13 is a flowchart illustrating a method of classifying the product group of a semiconductor memory device according to an embodiment of the present disclosure.

FIG. 13 is a flowchart illustrating a method of classifying the product group of a semiconductor memory device according to an embodiment of the present disclosure.

The method of classifying the product group of a semiconductor memory device according to an embodiment of the present disclosure will be described in detail below with reference to FIGS. 1 to 5, 6A, 6B, 8, 9A, 9B, and 13.

At step S1310, the positive breakdown voltages and the negative breakdown voltages of respective memory cells included in the semiconductor memory device are individually measured.

The positive breakdown voltage measurement method and the negative breakdown voltage measurement method may be performed by applying the test voltage Vtest to the selected word line, as illustrated at steps S810 and S820 of FIG. 8 and in FIGS. 9A and 9B.

At step S1320, the variation in the positive breakdown voltages of memory cells included in the memory string and the variation in the negative breakdown voltages of the memory cells thereof are calculated.

For example, as the memory cells included in the selected memory string are more adjacent to the source line SL, the memory cells have a low positive breakdown voltage, whereas, as the memory cells are more adjacent to the bit line BL, the memory cells have a high positive breakdown voltage. Further, as the memory cells included in the selected memory string are more adjacent to the source line SL, the memory cells have a low negative breakdown voltage, whereas, as the memory cells are more adjacent to the bit line BL, the memory cells have a high negative breakdown voltage. The variation in the positive breakdown voltages of the memory cells respectively corresponding to a plurality of word lines and the variation in the negative breakdown voltages thereof are calculated. That is, the slope of the graph of the positive breakdown voltages of the memory cells respectively corresponding to the plurality of word lines and the slope of the graph of the negative breakdown voltages thereof are calculated.

At step S1330, the semiconductor memory device may be classified as any one of a plurality of product groups based on the variation in the positive breakdown voltages of the memory string and the variation in the negative breakdown voltages thereof.

For example, the variation in the positive breakdown voltage and the variation in the negative breakdown voltage of at least one memory string selected from among the memory strings included in the semiconductor memory device may be compared with reference variations, and the semiconductor memory device may be classified as any one of the plurality of product groups based on the result of comparison.

Figure 14:
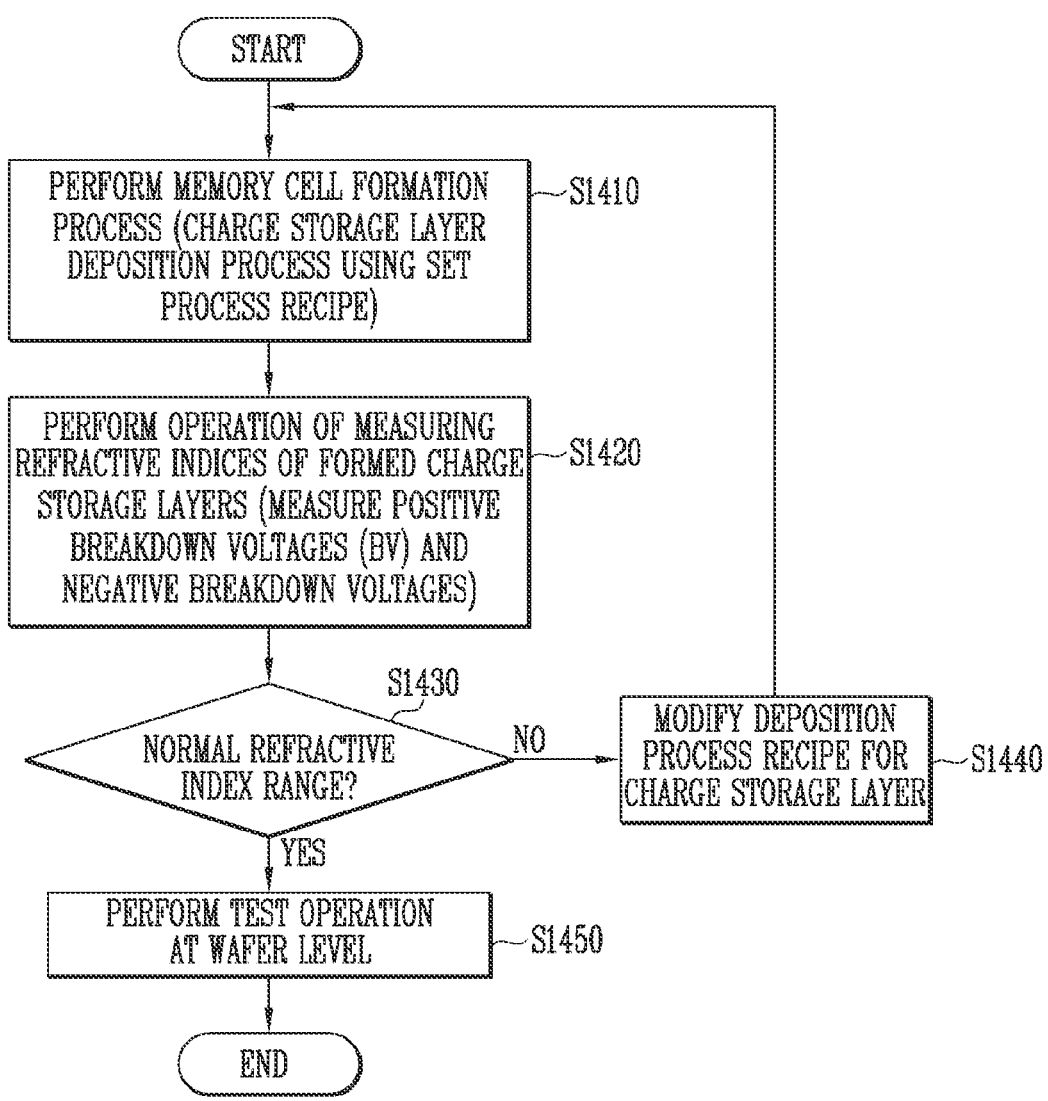
FIG. 14 is a flowchart illustrating a method for setting the deposition condition of a charge storage layer according to an embodiment of the present disclosure.

FIG. 14 is a flowchart illustrating a method for setting the deposition condition of a charge storage layer according to an embodiment of the present disclosure.

The method of setting the deposition condition of the charge storage layer will be described in detail below with reference to FIGS. 4, 5, 6A, 6B, 9A, 9B, and 14.

At step S1410, a process of forming memory cells is performed. The memory cell formation process may include a process of forming a memory string extending vertically on a semiconductor substrate. The memory string may include a channel layer (Channel), and a memory layer ONO including a charge storage layer.

Here, a process of depositing the charge storage layer may be performed using an initially set process recipe.

At step S1420, after memory cells are formed, an operation of measuring the refractive indices of charge storage layers is performed. For example, an operation of measuring the positive breakdown voltages of respective memory cells included in the memory string and an operation of measuring the negative breakdown voltages of respective memory cells are performed, and the refractive indices of the charge storage layers of the memory cells are checked based on the measured positive breakdown voltages and negative breakdown voltages.

The positive breakdown voltage measurement operation and the negative breakdown voltage measurement operation of each of the memory cells may be performed by applying the test voltage Vtest to the selected word line, as illustrated at steps S810 and S820 of FIG. 8 and in FIGS. 9A and 9B.

At step S1430, whether the refractive index of the charge storage layer of each memory cell falls within a normal refractive index range may be determined.

For example, when the refractive index of the charge storage layer of each of the memory cells falls within the range of ta of a reference refractive index, the refractive index is determined to fall within the normal refractive index range (in the case of Yes), whereas when the refractive index falls out of the range of ta of the reference refractive index, the refractive index is determined to fall out of the normal refractive index range (in the case of No).

When it is determined that the refractive index of the charge storage layer of each memory cell does not fall within the normal refractive index range (in the case of No), the deposition process recipe for the charge storage layer may be modified at step S1440, and a procedure from the above-described step S1410 is performed again.

When it is determined that the refractive index of the charge storage layer of each memory cell falls within the normal refractive index range (in the case of Yes), a test operation at a wafer level may be additionally performed at step S1450. Further, when it is determined that the refractive index of the charge storage layer of each memory cell falls within the normal refractive index range, the process recipe used in the charge storage layer deposition process may be utilized as an optimal deposition condition recipe.

As described above, the present disclosure may form charge storage layers, may perform the operation of measuring the negative breakdown voltages of memory cells and the operation of measuring the positive breakdown voltages of the memory cells to check the refractive indices of the charge storage layers of the memory cells, and may modify a deposition process recipe for the charge storage layers or set the recipe as the optimal process recipe based on the checked refractive indices.

According to the present disclosure, the refractive index of charge storage layers of memory cells may be measured by measuring gate currents of respective memory cells. Further, the product group of the semiconductor memory device may be classified based on the measured refractive index. Furthermore, when charge storage layers are formed, a deposition condition having a uniform refractive index may be detected.

The embodiments disclosed in the present specification and the drawings just aim to help those skilled in the art more clearly understand the present disclosure rather than aiming to limit the bounds of the present disclosure. Variations and modifications of the basic inventive concept described herein will still fall within the spirit and scope of the present disclosure as defined in the appended claims and their equivalents.

Unless otherwise defined, all terms including technical and scientific terms used herein have the same meaning as commonly understood by one of ordinary skill in the art to which the present disclosure pertains. Unless otherwise defined in the present disclosure, the terms should not be construed as being ideal or excessively formal.

What is claimed is:

1. A method of measuring a refractive index of a semiconductor memory device, the method comprising:
   measuring a positive breakdown voltage and a negative breakdown voltage of each of memory cells coupled to a selected word line; and
   checking a refractive index of a charge storage layer of each of the memory cells based on the measured positive breakdown voltage and the measured negative breakdown voltage.

2. The method according to claim 1, wherein measuring the positive breakdown voltage comprises:
   applying a test voltage that is gradually increasing to the selected word line; and
   measuring an amount of current flowing through the selected word line.

3. The method according to claim 2, wherein the test voltage is a positive voltage.

4. The method according to claim 1, wherein measuring the negative breakdown voltage comprises:
   applying a test voltage that is gradually decreasing to the selected word line; and
   measuring an amount of current flowing through the selected word line.

5. The method according to claim 4, wherein the test voltage is a negative voltage.

6. The method according to claim 1, wherein, as the measured positive breakdown voltage becomes higher, the refractive index of the charge storage layer becomes lower.

7. The method according to claim 1, wherein, as the measured negative breakdown voltage becomes higher, the refractive index of the charge storage layer becomes higher.

8. A method of measuring a refractive index of a semiconductor memory device, the method comprising:
   dividing memory cells included in a memory string into a lower memory cell group and an upper memory cell group;
   measuring a negative breakdown voltage of each of first memory cells included in the lower memory cell group;
   checking a refractive index of a charge storage layer of the first memory cells based on the measured negative breakdown voltage;
   measuring a positive breakdown voltage of each of second memory cells included in the upper memory cell group; and
   checking a refractive index of a charge storage layer of the second memory cells based on the measured positive breakdown voltage.

9. The method according to claim 8, wherein the first memory cells are memory cells adjacent to a source line and the second memory cells are memory cells adjacent to a bit line.

10. The method according to claim 8, wherein measuring the negative breakdown voltage comprises:
    applying a test voltage that is gradually decreasing to a word line selected from among first word lines coupled to the first memory cells; and
    measuring an amount of current flowing through the selected word line.

11. The method according to claim 10, wherein the test voltage is a negative voltage.

12. The method according to claim 8, wherein measuring the positive breakdown voltage comprises:
    applying a test voltage that is gradually increasing to a word line selected from among second word lines coupled to the second memory cells; and
    measuring an amount of current flowing through the selected word line.

13. The method according to claim 12, wherein the test voltage is a positive voltage.

14. A method of classifying a product group of a semiconductor memory device, comprising:
    measuring a breakdown voltage of each of memory cells included in a semiconductor memory device;
    checking a refractive index of a charge storage layer based on breakdown voltages of certain memory cells selected from among the memory cells; and
    classifying a product group of the semiconductor memory device by comparing the checked refractive index of the charge storage layer with a reference refractive index.

15. The method according to claim 14, wherein measuring the breakdown voltage comprises:
    measuring a positive breakdown voltage of each of the memory cells; and
    measuring a negative breakdown voltage of each of the memory cells.

16. The method according to claim 15, wherein measuring the positive breakdown voltage of each of the memory cells comprises:
    applying a test voltage that is gradually increasing to a word line selected from among a plurality of word lines coupled to the memory cells; and
    measuring an amount of current flowing through the selected word line.

17. The method according to claim 15, wherein measuring the negative breakdown voltage of each of the memory cells comprises:
    applying a test voltage that is gradually decreasing to a word line selected from among a plurality of word lines coupled to the memory cells; and
    measuring an amount of current flowing through the selected word line.

18. A method of classifying a product group of a semiconductor memory device, comprising:
    measuring a breakdown voltage of each of memory cells included in a memory string selected from among a plurality of memory strings included in a semiconductor memory device;
    checking a variation in the breakdown voltage of each of the memory cells, and then calculating a slope of the breakdown voltage; and
    classifying a product group of the semiconductor memory device based on the slope of the breakdown voltage.

19. The method according to claim 18, wherein measuring the breakdown voltage comprises:
    measuring a positive breakdown voltage of each of the memory cells; and
    measuring a negative breakdown voltage of each of the memory cells.

20. The method according to claim 19, wherein measuring the positive breakdown voltage of each of the memory cells comprises:
    applying a test voltage that is gradually increasing to a word line selected from among a plurality of word lines coupled to the memory cells; and
    measuring an amount of current flowing through the selected word line.

21. The method according to claim 19, wherein measuring the negative breakdown voltage of each of the memory cells comprises:

applying a test voltage that is gradually decreasing to a word line selected from among a plurality of word lines coupled to the memory cells; and measuring an amount of current flowing through the selected word line.

* * * * *